Nov. 4, 1952 J. A. BLAIR 2,616,401
FLUID MOTOR MECHANISM WITH REVERSING MEANS
Filed Sept. 8, 1945 6 Sheets-Sheet 1

INVENTOR.
John A. Blair,
BY
Harness, Dickey & Pierce
ATTORNEYS.

Nov. 4, 1952   J. A. BLAIR   2,616,401
FLUID MOTOR MECHANISM WITH REVERSING MEANS
Filed Sept. 8, 1945   6 Sheets-Sheet 3

INVENTOR.
John A. Blair
BY
Harness, Dickey & Pierce.
ATTORNEYS.

Nov. 4, 1952

J. A. BLAIR 2,616,401

FLUID MOTOR MECHANISM WITH REVERSING MEANS

Filed Sept. 8, 1945

INVENTOR.
John A. Blair.
BY
Harness, Dickey & Pierce.
ATTORNEYS.

Patented Nov. 4, 1952

2,616,401

UNITED STATES PATENT OFFICE 2,616,401

FLUID MOTOR MECHANISM WITH REVERSING MEANS

John A. Blair, Pleasant Ridge, Mich., assignor to King-Seeley Corporation, Ann Arbor, Mich., a corporation of Michigan Application September 8, 1945, Serial No. 615,219

2 Claims. (Cl. 121—164)

The present invention relates to fluid motor mechanisms, and in particular provides such mechanisms embodying improved means for causing the movable elements of the motors to move to and stop at terminal positions which may be at a desired distance beyond the normal operating limits of the motors. An illustrative application of the present motor mechanisms is in connection with automotive windshield wiper systems.

Principal objects of the present invention are to provide fluid motor mechanisms, of the above generally indicated type, which are simple in arrangement, economical of manufacture, and assembly, and which are reliable and efficient in operation: to provide such constructions of the reciprocating type, employing automatically operated reversing valve mechanism, and further employing parking control valve mechanism, which, generically, serves to reverse the action of the reversing valve mechanism, and establish circuits, through such mechanisms, which cause the motor to immediately move to and stop at a predetermined terminal position; to provide such mechanisms wherein a parking operation of the control valve, made at any time, regardless of the direction of travel of the motor, serves to immediately establish connections through the reversing valve mechanisms which cause the motor to move to and stop at the predetermined terminal position; to provide such mechanisms wherein in certain embodiments, the control and reversing valve mechanisms are disposed at respectively opposite sides of a valve block, wherein in certain other embodiments the control and reversing valve elements are of telescopically related spool form and wherein in certain other embodiments the control valve is carried by the reversing valve; and to generally improve and simplify the construction and arrangement of fluid motor mechanisms of the above generally indicated types.

With the above as well as other and more detailed objects in view, which appear in the following description and in the appended claims, preferred but illustrative embodiments of the invention are shown in the accompanying drawings, throughout the several views of which corresponding reference characters are used to designate corresponding parts and in which:

It will be appreciated from a complete understanding of the invention that, in a generic sense, the improvements thereof may be embodied in fluid motors of widely differing types and sizes, and particularly designed for widely differing applications. In an illustrative but not in a limiting sense, the improvements are herein disclosed as being embodied in a fluid motor of the double piston type, an example of which is specifically described in Patent No. 2,354,189, granted to Rupert B. Bell, on July 25, 1944. The illustrated mechanisms are well adapted for use in connection with vehicle windshield wiper systems in, for example, the manner described in said patent.

Referring to the drawings, the improved motor 10 comprises generally a cylindrical housing or cylinder 12, which is provided with removable end closures 14. Cylinder 12 slidably receives a piston assembly comprising a pair of spaced pistons 16, which are rigidly secured as by studs 18 to a connecting rack 20. The motor shaft 22 which is rotatably journaled in bearings 24 and 26 provided therefor in the cylinder 12 has fixed thereon as by a pin 27, a gear segment 28 which continuously meshes with the rack 20. Accordingly, reciprocating movements of the piston assembly are translated into oscillatory or rocking movements of the shaft 22. In the illustrated embodiment, the shaft 22 is provided with a crank 34, which is adapted for connection to the associated means to be operated by the motor.

It will be appreciated that the piston movements are effected by applying differential pressures in the chamber spaces 17 and 19 which lie between the piston 16 and the corresponding end closures 14, the space between the pistons being continuously vented to atmosphere in the illustrated instance. These differential pressures may, of course, be obtained from any suitable source. For example, in utilizing the motor 10 to drive a windshield wiper system, the pressure differential may be the difference between atmospheric and subatmospheric pressure obtained in usual fashion by connecting motor 10 through line 40, to the intake manifold of the associated automobile engine.

In accordance with conventional practice, motor 10 is provided with snap acting reversing valve mechanism 50, which is automatically actuated at each normal limit of travel of the piston assembly to reverse the applied fluid pressures and cause the motor to travel in the opposite direction. In addition, the present motor is provided with a manually operable control valve 52, which can be operated at any time, from the running position shown in Figure 1, to a parking position, to cause the motor to move to and stop at a parking position which is at a desired distance beyond a predetermined one of the normal limits of travel. The arrangement is such that if the control valve is moved to the parking position while the motor is moving away from the parking terminal, the motor immediately reverses and travels to the parked position. If the parking valve is moved to parked position at a time while the motor is moving towards the parking terminal, no change is made in the pressures as applied to the motor and it continues in the same direction until the parking terminal is reached.

Any one of a relatively wide variety of automatic reversing valve mechanisms may be utilized in the practice of the invention, the only requirement being that such valve mechanisms be effective to accommodate a desired amount of over travel from the normal reversing point to the parked position of the motor. Briefly, the illustrated automatic reversing valve mechanism comprises a hood valve 60, which is slidably received in a groove 62 provided therefor in the valve block 64, for movement between two spaced operating positions, each corresponding to a particular direction of travel, and which two operating positions are diagrammatically shown in the upper two views in Figure 10. Valve 60 is provided with a rearwardly projecting operating post 66, which is received in a slot 70 provided in a valve actuator or kicker 72 which is pivotally supported upon the valve block 64 by means of a trunnion 74. A leaf spring 76 yieldably holds the trunnion 74 in its bearing and a similar spring 77 holds valve 60 on its seat. Kicker 72 is resiliently connected, by means of a tension spring 78, to a spring carrier 80, which is pivotally connected to the motor cylinder by means of a bearing provided by a stud 82. Carrier 80 is provided with spaced arms 84 which are disposed for engagement by abutments 86 formed on the rack 20 as the piston assembly approaches corresponding normal limits of travel. As will be appreciated, this engagement enables continued piston movement to rock the carrier 80 about its pivot 82, loading spring 78, and ultimately bringing the line of action of spring 78 near, at, or past an over-center position. At approximately the same time, one or the other of arms 84 engages the upper end of kicker 72, enabling continued movement of the spring carrier 80 to positively move the upper end of the kicker 72 and carry spring 78 past the over-center position. As soon as this is accomplished, the loaded spring 78 is enabled to snap valve kicker 72 to an opposite position, during the course of which movement it carries the reversing valve 60 from one of its operating positions to the other. Preferably, the width of slot 70 in kicker 72 is greater than the diameter of pin 66, so that the movement of valve 66 is not initiated until after the spring 78 initiates the snapping movement of kicker 72.

Limits to the movements of the reversing valve 60 are preferably provided by the ends of the valve receiving groove 62, and limits to the snapping movements of the valve 72 are preferably provided by spaced shoulders 88, which are disposed for engagement by a cushioned bumper 90 on the kicker 72. As soon as the kicker 72 is snapped, as aforesaid, its upper end moves away from that one of the spring carrier arms which actuated it. Consequently, when, under parking conditions, the motor movement is continued past the reversing position, such continued piston movements serve only to continue the rocking movement of the spring carrier 80, and does not require or produce a further movement of the kicker 72.

The parking valve 52 is illustrated as being of the slidable type, and is being received in a pocket 100, formed therefor in the outer face of the previously mentioned valve block 64. Pocket 100 is provided with a removable cover 102, and a leaf spring 104 is provided to yieldingly bias the control valve into engagement with its seat.

Coming now to the arrangement of pockets in the reversing and control valves, and the arrangements of ports and passages in the valve block 64, the parking valve 52 is provided with a pair of spaced blind pockets 110 and 112, and with a through passage 114. The reversing valve 60 in turn is provided with a series of three blind pockets 116, 118, and 120.

Figure 1:
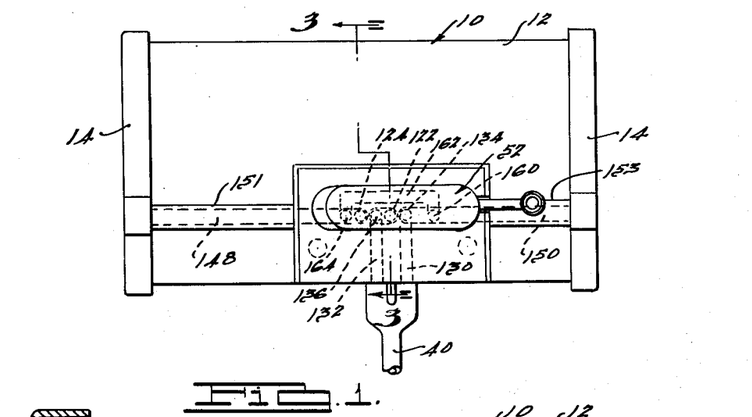
Figure 1 is a view in side elevation of a fluid motor embodying the invention.
Figure 2:
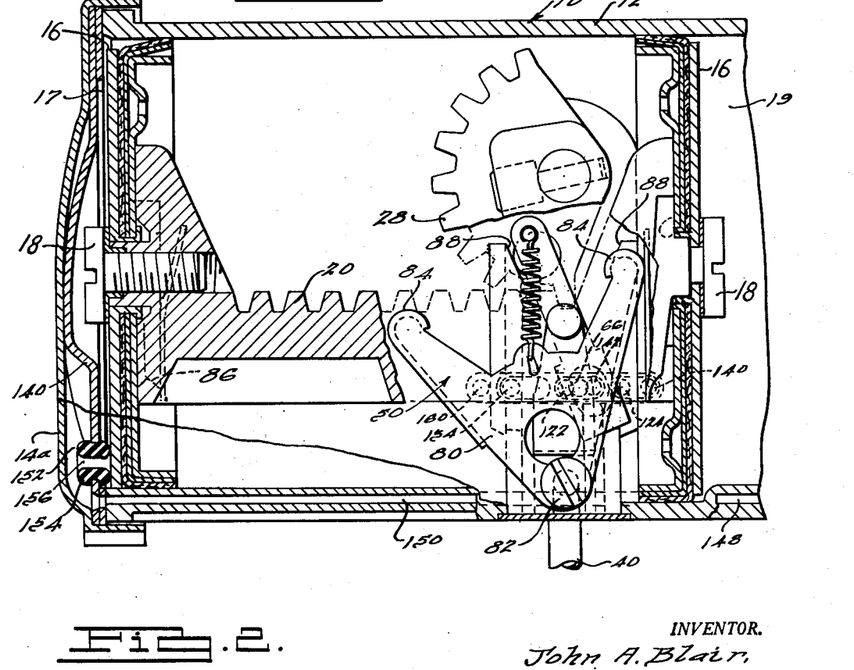
Figure 2 is a view in longitudinal central section, with certain of the parts broken away, and taken generally along the line 2—2 of Figure 3.
Figures 3, 4:
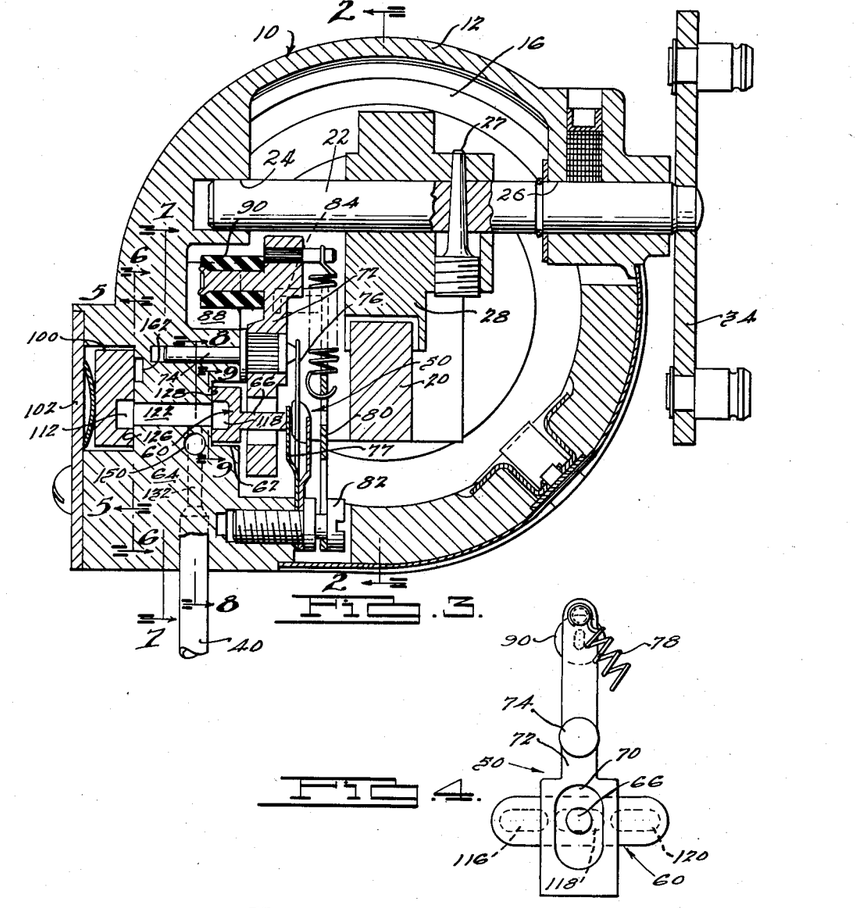
Figure 3 is a view in transverse vertical section, taken along the line 3—3 of Figure 1.
Figure 4 is a fragmentary view illustrating a portion of the reversing valve mechanism of Figures 2 and 3.
Figure 5:
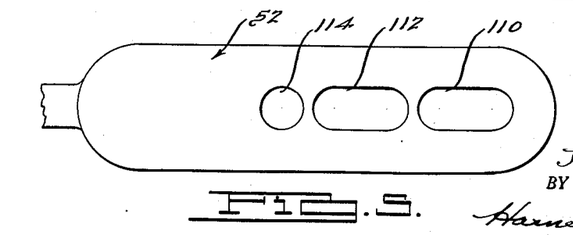
Figure 5 is a view, taken along the line 5—5 of Figure 3, showing the contruction of the control valve.
Figure 6:
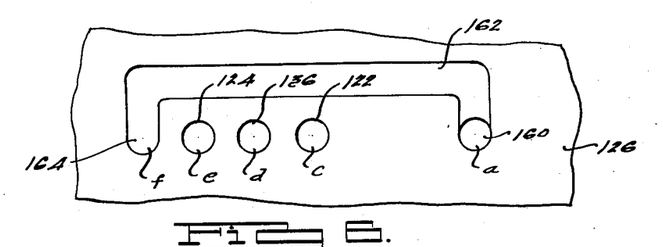
Figures 6, 7, 8, and 9 are fragmentary sectional views, taken, respectively, along the lines 6—6, 7—7, 8—8, and 9—9, of Figure 3.
Figure 7:
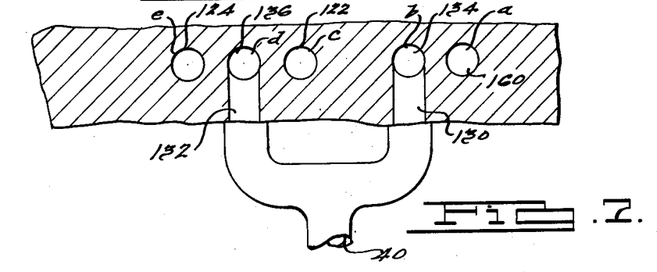
Figure 8:
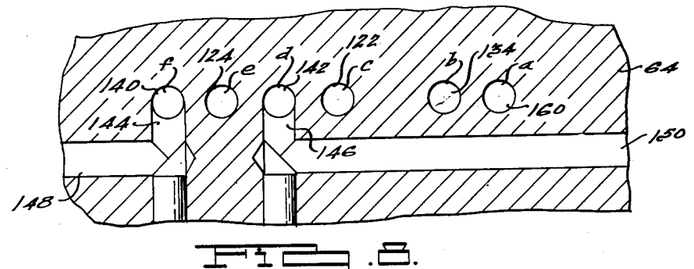
Figure 9:
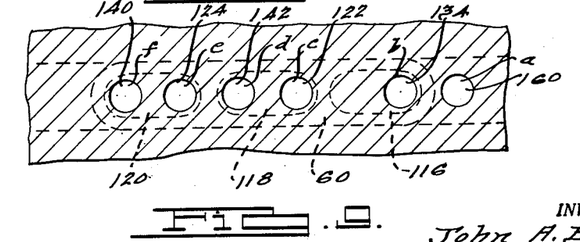
Figure 10:
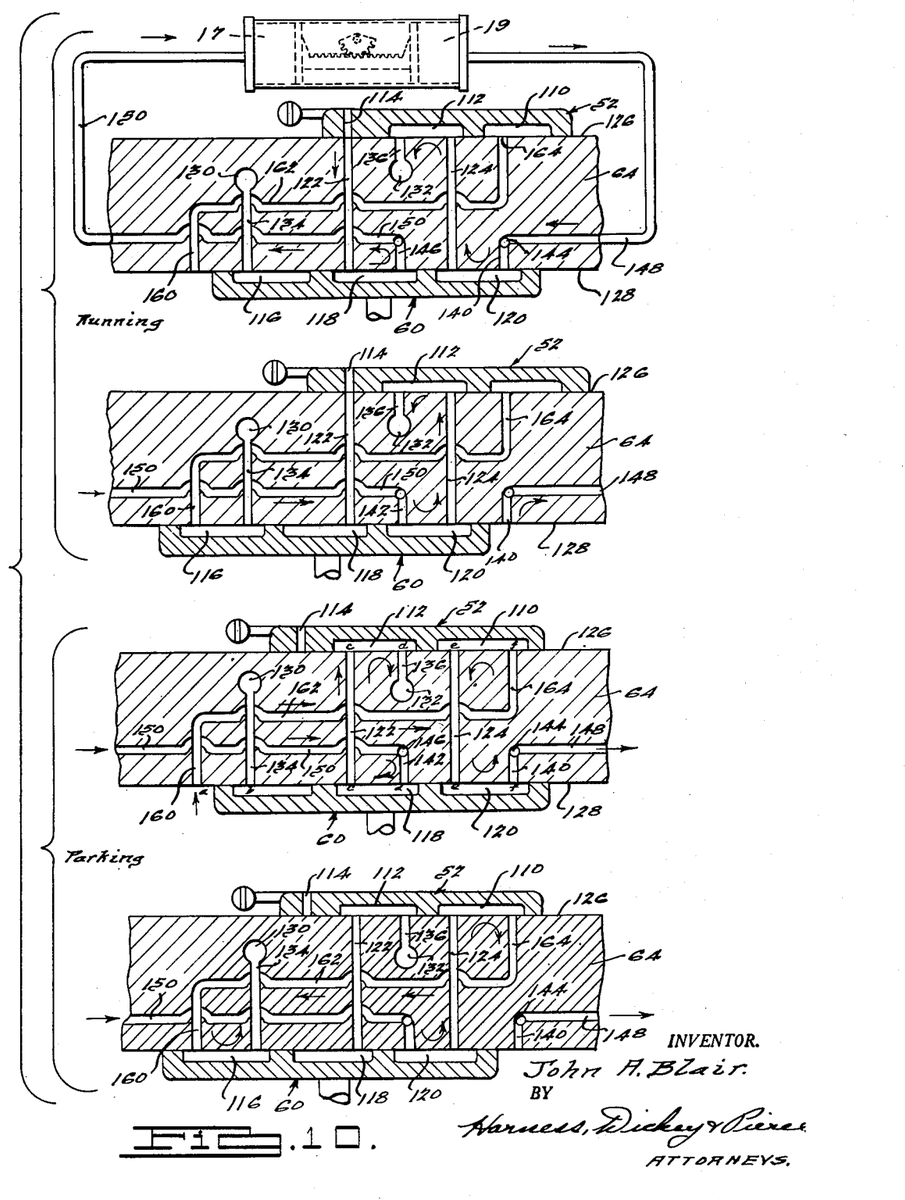
Figure 10 is a diagrammatic view, illustrative of the fluid circuits established under different running and parking conditions of the motor.

Referring particularly to the sectional views of Figures 6, 7, 8, and 9, and to the diagrammatic view of Figure 10, the valve block 64 is provided with a pair of through passages 122 and 124, which open through the control valve seat 126 as well as through the reversing valve seat 128. In addition, valve block 64 is provided with a pair of spaced vertically extending passages 130 and 132, which, as shown in Figure 1, are continuously connected to the previously mentioned suction line 40. Passages 130 and 132 connect, respectively, with lateral passages 134 and 136, which open, respectively, through the reversing valve face 128 and the control valve face 126. To provide connections to the respective piston chambers 17 and 19, valve block 64 is provided with lateral passages 140 and 142, which continuously communicate, through short plugged vertical passages 144 and 146, with longitudinally extending passages 148 and 150. Passages 148 and 150 are formed in a boss 151–153 which projects radially from the surface of the motor cylinder 12, and these passages open into the piston chambers 19 and 17, respectively. While the present motor may, of course, be arranged to park at either limit position, the illustrated porting is such that the motor 10 parks at the left-hand limit, a viewed in Figures 2 and 10, which position corresponds to a right-hand position as viewed in Figures 1 and 6 through 9. With this arrangement, chamber 19 is connected to atmosphere when the motor is parked, and consequently cylinder passage 148 may, if desired, be arranged to open directly into chamber 19 immediately adjacent the corresponding end closure 14. On the other hand, in the parked position, chamber 17 is associated with the suction circuit and it is consequently preferred to provide means to close off such suction line when the left-hand piston reaches the parking position. Accordingly, in accordance with the arrangement described in the copending application of Emil E. Sivacek, Serial No. 564,829, filed November 23, 1944, the passage 150 is arranged to open into a small auxiliary chamber 152 which is formed between the two spaced laminations 14a and 14b of the corresponding closure 14. The inner lamination 14a is provided with an aperture which receives a grommet 154, having a passage 156 therethrough. When the corresponding piston 16 reaches the parking position, it engages and is resiliently brought to rest by grommet 154. Such engagement also closes off passage 156, causing the piston 16 to be maintained at the parking position under the influence of the suction in passage 150.

Reverting to the description of the passages in valve block 64, it is further provided with a passage 160 which extends entirely therethrough from the reversing valve seat 128 to the control valve seat 126. The control valve seat 126 is provided with a shallow groove 162, of generally U-shape, which extends from passage 160 to a point 164 which is immediately to the left of passage 124. The groove 162 is at all times covered by the body of the control valve 52, and this groove, therefore, serves only to continuously interconnect passage 160 with what may be termed, for present descriptive purposes, the control valve port 164. In the diagrammatic view, Figure 10, all passages through the valve block are considered as lying in substantially the same plane and consequently, to simplify the drawing, the groove 162 is illustrated as being formed entirely within the body of the block 64.

As appears in the upper two views of Figure 10, when the control valve 52 is in the running position, the pocket 110 thereof serves to close off the previously mentioned control port 164; pocket 112 bridges and interconnects passages 136 and 124; and the through passage 114 serves to vent passage 122 to the atmosphere. In its parking position, on the other hand, as appears in Figure 1 and in the lower two views of Figure 10, pocket 110 bridges port 164 and passage 124; pocket 112 bridges and interconnects passages 122 and 136, and the through passage 114 is inactive. Further, as viewed in Figure 9, and in the top view of Figure 10, when the reversing valve 60 is in a position to cause rightward travel of the motor as viewed in Figures 2 and 10 (or leftward travel of the motor as viewed in Figures 1 and 6 through 9), pocket 116 bridges but closes off passage 134; pocket 118 bridges and interconnects passages 122 and 150; pocket 120 bridges and interconnects passages 124 and 148; and passage 160 is exposed to atmosphere. In the opposite position of the reversing valve 60, however, shown in the second view of Figure 10, pocket 116 bridges and interconnects passages 134 and 160; pocket 118 bridges but closes off passage 122; pocket 120 bridges and interconnects passages 124 and 150, and passage 148 is exposed to atmosphere.

It is believed that the operation of the motor can best be described in connection with Figure 10 in which figure the upper two views show the suction and atmospheric circuits for the two positions of the reversing valve 60, and for the running position of the control valve 52. Referring to the top view, motor chamber 17 is connected to the atmosphere through a circuit which includes passages 114 and 122, pocket 118, and cylinder passage 150 into chamber 17. On the other hand, chamber 19 is connected to suction through a circuit which extends from the operating suction passage 132, through passage 136, control valve pocket 112, passage 124, reversing valve pocket 120, and passage 148 into chamber 19. Under these conditions, the piston assembly is caused to move to the right as viewed in Figures 1, 2, and 10. From previous description, it will be understood that when the normal right-hand limit of travel is reached, as viewed in these figures, the reversing valve 60 is automatically snapped to its opposite position, shown in the second view of Figure 10. Under these conditions, chamber 17 is connected to suction through a circuit which includes cylinder passage 150, reversing valve pocket 120, passage 124, control valve pocket 112, and passages 136 and 132 to the suction line. On the other hand, chamber 19 is connected directly to atmosphere through the new exposed cylinder passage 148. It will be noticed by inspection of the upper two views of Figure 10 that any fluid circuits, except the above traced suction and atmospheric circuits, are blind or inactive circuits under the above-mentioned operating conditions.

So long, therefore, as the control valve occupies the running position, the piston assembly reciprocates between normal left-hand and right-hand positions, determined by the adjustment of the operating means for the reversing valve 60.

The lower two views of Figure 10 illustrate the parking circuits which are established when valve 60 is moved from the running position to the parking position, and in both of these lower two views, the resulting circuits are such as to apply suction to the left-hand chamber 17 (Figures 2 and 10) and to apply atmospheric pressure to the right-hand chamber 19, thereby causing the motor to move to and stop at the parking position, at the left-hand limit of travel. In the third view of Figure 10, the reversing valve is in a position to cause rightward travel of the motor. The circuit for applying suction to chamber 17 extends through passages 150 and 142, reversing valve pocket 118, passage 122, control valve pocket 112, and passages 136 and 132 to the suction line 40. Under the same conditions the circuit for admitting atmospheric pressure to chamber 19 extends through passage 148, pocket 120, passage 124, pocket 110, and passages 162 and 160 to the atmosphere. Accordingly, it will be appreciated that if the control valve is moved to the parking position while the motor is moving to the right, as viewed in Figures 2 and 10, the operating pressures applied to the motor are immediately reversed, causing the motor to stop and re-start to the left. When the motor reaches the normal left-hand limit, no operation of the reversing valve 60 is produced, since, under these conditions, valve 60 is already in the position to which it would normally be moved by the arrival of the motor at the left-hand limit. Consequently, the motor continues on past the left-hand limit and comes to rest when the left-hand piston 16 seats over the grommet 154, thereby closing off the passage 156, all as described above.

The bottom view of Figure 10 illustrates the circuits which obtain in the event that the parking valve is moved to parking position when the motor is moving towards the parking position. Under these conditions, chamber 17 remains connected to suction and chamber 19 remains connected to atmospheric pressure, the only circuit change which is produced being a change in the arrangement of passages through which these chambers are connected respectively to suction and to atmosphere. More particularly, in the lower view of Figure 10, chamber 17 is connected to suction through passage 150, pocket 120, passage 124, pocket 110, passages 162 and 160, pocket 116, and passages 134 and 130 to the suction line 40. On the other hand, chamber 19 remains directly connected to atmosphere through passage 148. When the motor reaches the normal left-hand limit of travel, reversing valve 60 is automatically thrown to the position shown in the third view of Figure 10, which action has no effect on the suction and atmospheric conditions applied to chambers 17 and 19, since the circuits are now the same as those described in detail in connection with the third view of Figure 10. Accordingly, the motor continues on past the left-hand limit and comes to rest at the parking position at the left-hand limit of travel.

Figures 11, 12:
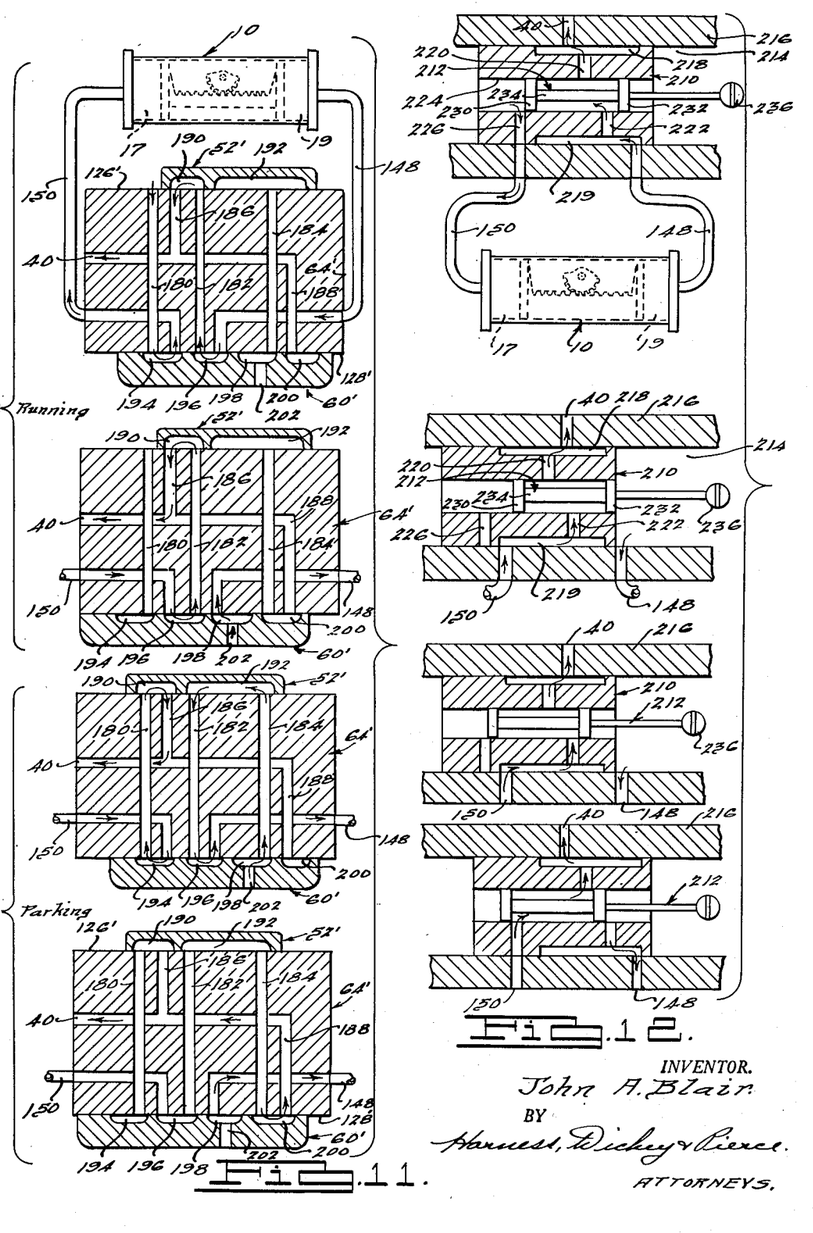
Figures 11, 12, 13, and 14 are, respectively, a series of diagrammatic views illustrating additional modifications of the invention, each such view illustrating a different modification.

The embodiment of Figure 11 is functionally the same as the above described embodiment of Figures 1 through 10, but employs a somewhat different arrangement of passages and pockets in the control and reversing valve members 52' and 60'. More particularly, in Figure 11, the valve block 64' is provided with through passages 180, 182, and 184 which open through the respective control and reversing valve seats 126' and 128'. In addition, the previously mentioned cylinder passages 148 and 150, open through the reversing valve seat 128'.

The suction line 40 is provided with branches 186 and 188, which open, respectively, through the valve seats 126' and 128'.

In this instance, the control valve is provided with a pair of blind pockets 190 and 192, and the reversing valve is provided with four pockets 194, 196, 198, and 200, all whereof are blind pockets, except that pocket 198 is continuously connected to atmosphere through a short passage 202.

As indicated by the legends, the upper two views of Figure 11 are running positions, the top view showing the circuits which produce rightward movement of the piston assembly and the second view showing the circuits which produce leftward movement of the piston assembly. The lower two views of Figure 11, on the other hand, show the circuits which obtain when the control valve 52' is in parking position, and it will be noticed that in both of these views, line 150 is connected to suction, independently of the position of the reversing valve 60', thereby continuously completing the circuits which cause the motor to move to and stop at the left-hand terminal position.

More particularly, in the top view of Figure 11, the suction chamber 17 is connected to atmosphere through a circuit which includes line 150, reversing valve pocket 194, and passage 180, to atmosphere. At the same time, chamber 19 is connected to suction through a circuit which extends from the suction line 40, branch passage 186, control valve pocket 190, passage 182, reversing valve pocket 196, and line 148 to chamber 19. In the second view of Figure 11, the suction circuit for chamber 17 extends from the suction line 40 through branch passage 186, pocket 190, passage 182, reversing valve pocket 196, and line 150 to chamber 17. In the same figure, the atmospheric circuit for chamber 19 extends through line 148, and reversing valve pocket 198 and passage 202 to atmosphere. The suction and atmospheric circuits for chambers 17 and 19 respectively, in the lower two or parking views, are believed to be obvious from the above description.

Except as noted above, the construction and arrangement of the embodiment of Figure 11 may duplicate that of Figures 1 through 10.

The embodiment of Figure 12 is functionally the same as those of Figures 1 through 11, with the exception that in this instance, the automatic reversing valve and manually controlled control valve members, 210 and 212, respectively, are telescopically related, and are of spool form. More particularly, the automatic reversing valve element 210, of tubular form, is slidably but non-rotatably received in a cylindrical bore 214 provided in the associated valve block 216. Valve element 210 is provided with two longitudinally extending diametrically opposite grooves 218 and 219; and with two diametrically opposite radially extending passages 220 and 222. Passage 220 interconnects groove 218 with the central bore 224 of valve element 210, and passage 222 connects groove 219 to the bore 224. In addition, reversing valve element 210 is provided with a radial passage 226, which extends from the bore 224 thereof through to the outer face, at a point which is angularly aligned with, but axially displaced from, the groove 219.

The valve block is provided with a suction passage 40, which continuously communicates with the groove 218, and with the indicated chamber passages 148 and 150, both of which open into the bore 214 at points which are angularly aligned with groove 219 and passage 226.

The control valve 212 is provided with heads 230 and 232, and with an intervening radially reduced portion 234, which defines an annular groove in the control valve 212.

The upper two views show the circuits which are established under running conditions, the control valve 212 being in its running position. The lower two views of Figure 12 show the circuits which are established under parking conditions, with the control valve 212 in its left-hand or parking position.

More particularly, in the top view of Figure 12, chamber 17 is connected to atmosphere through line 150 and passage 226. Under the same conditions, chamber 19 is connected to suction through a circuit which extends from the suction line 40, through groove 218, passage 220, around the reduced portion 234 of the control valve, passage 222, groove 219, and line 148 to chamber 19. In the second view of Figure 12, chamber 17 is connected to suction, through a circuit which extends from the suction line 40, as previously traced to groove 219, and thence through line 150 to chamber 17. Under these conditions, chamber 19 is connected directly to atmosphere through line 148.

In both of the lower views, as aforesaid, chamber 17 is connected to suction, the circuits being obvious from the above description. Accordingly, movement of control valve 212 from the running position to the parking position immediately establishes circuits which cause the piston assembly to move to and stop at the left-hand terminal position.

The spool type construction of Figure 12 will be recognized as being very advantageous in that pressures are equalized around the peripheries of the control and reversing valves, thereby eliminating any tendencies of these valve elements to stick. It will be appreciated that any suitable means may be utilized to couple the reversing valve 212 to snap over mechanism of the type described in connection with Figures 1 through 10, and that any suitable means, indicated as a control knob 236 may be provided to effect movements of the control valve 212 between the indicated running and parking positions, and to yieldably hold it in these positions, so that snap over movements of the reversing valve, during operation, do not influence the position of the control valve. In all respects, other than those noted above, the construction of Figure 12 may and preferably does duplicate the construction of Figures 1 through 10.

Figure 13:
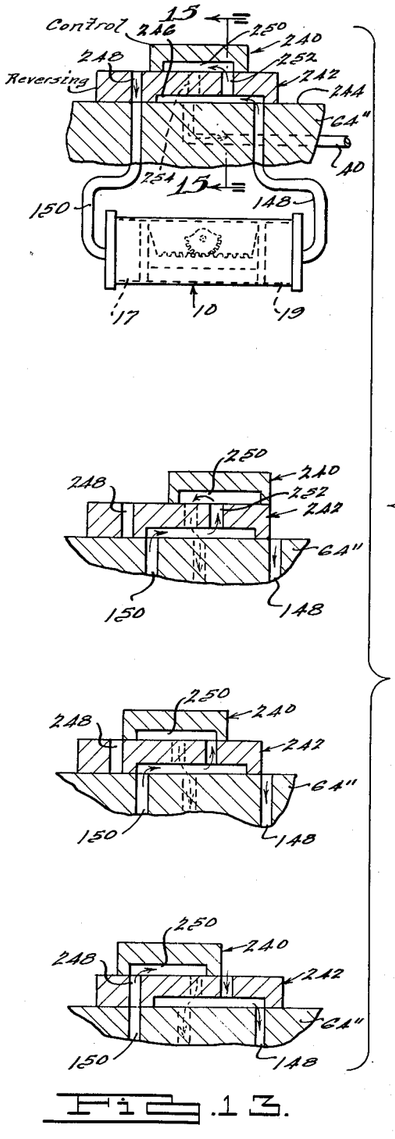
Figures 14, 15:
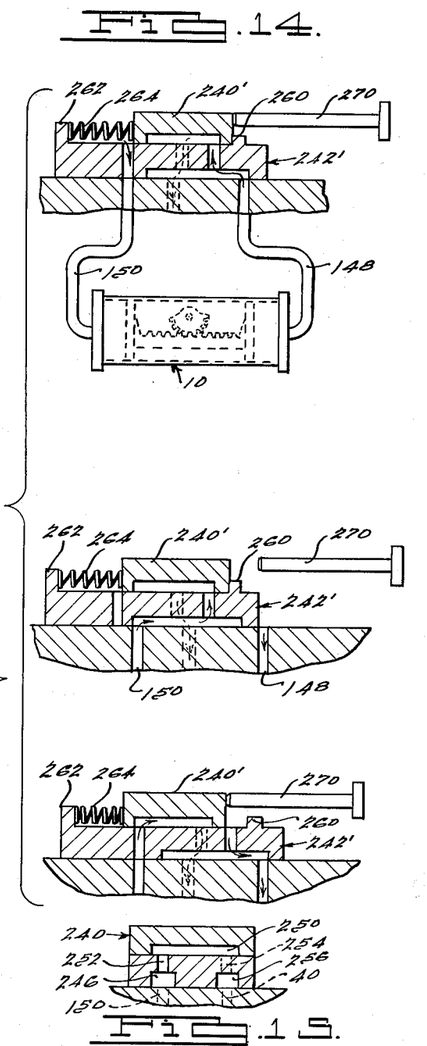
Figure 15 is a view taken along the line 15—15 of Figure 13.

The embodiment of Figures 13 and 15 is functionally the same as the embodiments described above. In this instance, however, the control valve 240 is carried by the automatic reversing valve 242.

In this embodiment, the chamber passages 148 and 150 open through the reversing valve seat 244, which is provided on the valve block 64". The corresponding openings are aligned with each other, in the direction of reciprocating movements of the reversing valve 242, so that in one position, the reversing valve pocket 246 bridges passage 148, and in the other position, it bridges passage 150. In the first-mentioned position, a through passage 248, provided in the reversing valve, is aligned with passage 150 and connects the latter to atmosphere; in the latter position, reversing valve 242 is to the left of passage 148 and so directly exposes it to atmosphere.

As appears by comparison of Figures 13 and 15, the control valve 240 is provided with a single blind pocket 250, which, in the running position, bridges the laterally offset passages 252 and 254 which are provided in the reversing valve 242. Passage 252 opens through the outer face of the reversing valve and also opens into the previously mentioned pocket 246. Passage 252 opens through the outer face of the reversing valve 242, and also opens into a laterally displaced pocket 256, which bridges the suction passage 40 in all positions of the reversing valve.

As before, the upper two views of Figure 13 show the circuits which are established under running conditions, and the lower two views of the same figure show the circuits which are established under parking conditions. More particularly, in the top view, chamber 17 is connected directly to atmosphere through the aligned passages 150 and 248. At the same time, chamber 19 is connected to suction through a circuit which extends from the suction line 40, into reversing valve pocket 256, passage 254, control valve pocket 250, passage 252, pocket 246, and line 148 into chamber 19. In the second view, of Figure 13, chamber 19 is connected directly to atmosphere through passage 148, and chamber 17 is connected to suction through a circuit which extends, as previously traced (for chamber 19), from suction line 40 into pocket 246. From pocket 246, the suction circuit for chamber 17 extends through line 150 into chamber 17.

In the lower two views of Figure 13, chamber 17 is continuously connected to suction, the circuits being believed to be obvious from the above description.

In the above described embodiments, the control valve 240 may, during normal operation, either move with the reversing valve or may normally remain stationary. By way of illustration, it is assumed that it remains stationary, under the influence of control means such as are described in connection with Figure 12. To effect a parking movement, it is moved from the right-hand or running position, to the left-hand or parking position, shown in the lower two views.

The remaining embodiment, shown in Figure 14, corresponds to the embodiment of Figures 13 and 15, with the exception that in this case provision is made for normally causing the parking valve 240' to move with the reversing valve 242'. More particularly, the reversing valve 242' is provided with upstanding abutments 260 and 262, between which the control valve 240' is movable, and a compression spring 264 is provided to normally hold control valve 240' in the running position shown in the upper view, in which it continuously engages the abutment 260. In order to move control valve 240' to the parking position, a manually controlled operator 270 is provided, which may be advanced from its right-hand or running position to its left-hand or parking position, in which it forcibly holds valve 240' in the parking position.

Although only several specific embodiments of the invention have been described in detail, it will be appreciated that various further modifications in the form, number, and arrangement of the parts may be made without departing from the spirit and scope of the invention.

What is claimed is:

1. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor, said valve mechanism including reversing valve means having means defining passage means for connecting said supply passage to said motor and being automatically operable at said limits to reverse said connection, and control valve means operable, at any time regardless of the position of said reversing valve means to establish a connection, through said reversing valve passage means, of said supply passage to said motor which causes a said relative movement toward one of said limits, said reversing and control valve means being telescopically related to each other.

2. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor, said valve mechanism including reversing valve means having means defining passage means for connecting said supply passage to said motor and being automatically operable at said limits to reverse said connection, and control valve means operable, at any time regardless of the position of said reversing valve means to establish a connection, through said reversing valve passage means, of said supply passage to said motor which causes a said relative movement toward one of said limits, said valve mechanism including a valve seat and one of said valve means being interposed between said seat and the other valve means.

JOHN A. BLAIR.

REFERENCES CITED

The following references are of record in the file of this patent:

UNITED STATES PATENTS

| Number | Name | Date |
|---|---|---|
| 1,674,056 | Oishei et al. | June 19, 1928 |
| 1,840,233 | Hueber | Jan. 5, 1932 |
| 2,354,189 | Bell | July 25, 1944 |
| 2,583,348 | Utter | Jan. 22, 1952 |
| 2,593,626 | Stoltenberg | Apr. 22, 1952 |

FOREIGN PATENTS

| Number | Country | Date |
|---|---|---|
| 697,976 | France | Nov. 5, 1930 |
| 473,296 | Great Britain | Oct. 11, 1937 |